United States Patent [19]

Hochberg et al.

[11] Patent Number: 4,564,650
[45] Date of Patent: * Jan. 14, 1986

[54] FLAME RETARDANT AMINE TERMINATED POLYAMIDE COMPOSITION

[75] Inventors: Arie Hochberg, Montclair; Charles D. Mason, Chatham, both of N.J.

[73] Assignee: Allied Corporation, Morris Township, N.J.

[*] Notice: The portion of the term of this patent subsequent to Jun. 25, 2002 has been disclaimed.

[21] Appl. No.: 564,610

[22] Filed: Dec. 22, 1983

[51] Int. Cl.⁴ ............................................. C08K 5/10
[52] U.S. Cl. ................................. 524/288; 524/469; 524/606; 525/183
[58] Field of Search ................ 524/288, 469, 606; 525/183, 426

[56] References Cited

U.S. PATENT DOCUMENTS

| | | | |
|---|---|---|---|
| 4,128,709 | 12/1978 | Vollkommer et al. | 525/169 |
| 4,137,212 | 1/1979 | Theysohn et al. | 524/606 |
| 4,301,058 | 11/1981 | Neukirchen et al. | 524/469 |
| 4,373,049 | 2/1983 | Richardson | 524/375 |
| 4,454,302 | 6/1984 | Ohmura et al. | 524/409 |

Primary Examiner—Veronica P. Hoke

Attorney, Agent, or Firm—Richard A. Negin; Patrick L. Henry

[57] ABSTRACT

The present invention is a flame retardant composition comprising from 5 to 20 weight percent of a homopolymer of a monomer having the formula:

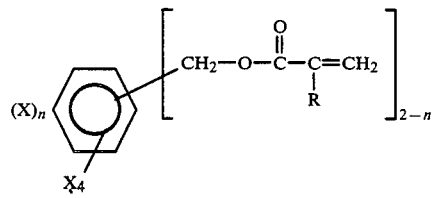

wherein $n=0$ or 1, X is bromine or chlorine and R is hydrogen or methyl. The polymer has a molecular weight between $1 \times 10^3$ and $10 \times 10^6$, and preferably $5 \times 10^3$ to $5 \times 10^6$. The molecular weight is determined by gel permeation chromotography in tetrahydrofuran. The composition contains from 80 to 95 weight percent of a polyamide having an excess of polymer chain ends terminated with amine groups. There can be from 0 to 10, preferably 1 to 10, and more preferably 2 to 6 weight percent of antimony oxide. Optionally, the composition can contain an impact modifier and/or a filler.

19 Claims, No Drawings

FLAME RETARDANT AMINE TERMINATED POLYAMIDE COMPOSITION

DESCRIPTION

BACKGROUND OF THE INVENTION

This invention relates to a flame retardant polyamide composition containing acrylate based polymers as flame retardants.

A wide variety of flame retardant additives for polyamides are available. However, many of the flame retardant materials are deleterious to the physical properties of polyamides. Typical of such materials are nonpolymeric materials which are nonsoluble in the polyamide matrix. These materials have been found to adversely affect the impact properties of polyamides.

Polymeric flame retardant type materials sold for use in thermoplastic materials have been found to be useful in a variety of polymers. However, these materials, although providing flame retardant properties, have often been found to be not compatible with polyamides. Typical of such materials is polymeric brominated polystyrene. This material has been found to be an effective flame retardant for polyamides. The use of polymeric brominated polystyrene to date has only been in glass filled polyamide compositions. The reason is that polymeric brominated polystyrene is not compatible with polyamides. It is necessary to use a dispersion aid such as short glass filler with the polymeric brominated polystyrene to uniformly distribute it throughout the polyamide matrix. Once this is done, it has been found to be an effective flame retardant.

Acrylate based flame retardant polymers are disclosed in U.S. Pat. Nos. 4,128,709 and 4,301,058, both hereby incorporated by reference. These disclosures disclose a variety of acrylate based polymers for use as flame retardant agents in thermoplastic compositions. Particularly disclosed is the use of pentabromobenzyl polyacrylate in a variety of polymers. However, neither patent discloses the use of such acrylate based polymers as flame retardants in polyamide compositions.

SUMMARY OF THE INVENTION

The present invention is a flame retardant composition comprising from 5 to 20 weight percent of a homopolymer of a monomer having the formula:

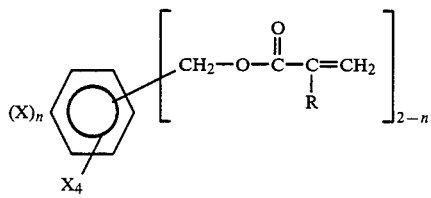

wherein $n=0$ or 1, X is bromine or chlorine and R is hydrogen or methyl. The polymer has a molecular weight between $1 \times 10^3$ and $10 \times 10^6$, and preferably $5 \times 10^3$ to $5 \times 10^6$. The molecular weight is determined by gel permeation chromotography in tetrahydrofuran. The composition contains from 80 to 95 weight percent of a polyamide having an excess of amine terminated polymer chains. There can be from 0 to 10, preferably 1 to 10, and more preferably 2 to 6 weight percent of antimony oxide. Optionally, the composition can contain an impact modifier and/or a filler.

In a preferred composition, the polyamide is polyepsiloncaprolactam having an excess of amine terminated polymer chain ends. The flame retardant is from 8 to 16 weight percent of the homopolymer of a monomer having the formula:

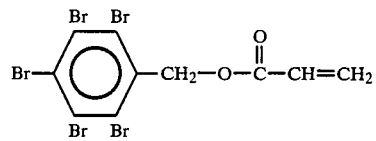

and further containing 2 to 6 weight percent of antimony oxide. Optionally, the composition can contain an impact modifier and/or a filler.

The present invention also includes a composition comprising a polyamide having an excess of terminal amine groups and up to 90 weight percent, preferably 1 to 90 weight percent, and more preferably 50 to 90 weight percent of the homopolymer described above. The composition contains from 0 to 30 weight percent of antimony oxide in place of a corresponding amount of the homopolymer. This composition is particularly useful as a masterbatch for use in blending the homopolymer with polyamide.

The present invention includes an embodiment wherein the composition is an unfilled flame retardant polyamide composition where the polyamide has an excess of terminal amine groups.

The use of the polyamide having an excess of terminal amine groups results in a composition which burns with little or no dripping of molten polymer during borning under the conditions of the UL-94 flammability test. The homopolymer and the polyamide having an excess of terminal amine groups used in the composition of the present invention have been found to be compatible. This is shown by the composition retaining tensile strength and improving in elongation compared to the composition without the homopolymers. Further, the composition of the present invention maintains impact resistance as compared to polyamide without the use of the homopolymer.

DESCRIPTION OF THE PREFERRED EMBODIMENTS

The present invention is a flame retardant polyamide composition comprising a polyamide having an excess of polymer chain ends termineated with amine groups and acrylate based flame retardant polymer.

Polyamides suitable for use herein include the long chain polymeric amides having recurring amide groups as part of the polymer backbone and preferably having a number average molecular weight, as measured by membrane osmometry of about 15,000 to 50,000 and containing an excess and preferably at least 1.5 times as many amine end groups as acid groups. An excess of polyamide polymer chain ends terminated with amine groups means that there is an excess of amine polymer chain end group termination over acid group termination.

Particularly preferred are polyamides prepared by the polymerization of epsilon-caprolactam in the presence of a comonomer containing two or more amine groups per molecule such as hexamethylene diamine.

Other lesser preferred examples of such polyamides are: (a) those prepared by the condensation of a diamine with a dibasic acid in the presence of an excess amount of diamine or a multifunctional amine compound containing at least three amino groups per molecule, with the diamine preferably being hexamethylene diamine and the dibasic acid being adipic acid or sebasic acid; (b) random interpolymers of the above monomer groups having an excess amount of diamine or other multifunctional amine compound; and (c) blends or block interpolymers comprising two or more of these polyamides, at least one of which is prepared with a surplus of polyfunctional amine as herein described. Preferred are those polyamides based on the polymerization of epsilon-caprolactam and those based on a diamine and a diacid, more preferred are those based on epsilon-caprolactam.

The polyamide can be produced by any conventional process known in art. Illustrative of one such process which is suitable for producing polyepsiloncaprolactam involves two steps. The first step consists of heating epsilon-caprolactam and a hexamethylene diamine and water to a temperature of from about 180° to 300° C. under superatmospheric pressure (about 200 to 280 lbs/in$^2$) to effect partial polymerization. The water is allowed to distill gradually from the reaction mixture while the polymerization continues after most of the monomer has been converted to a low molecule weight polymer. The pressure is reduced to atmospheric pressure wherein the second step is commenced which comprises completing the polymerization by heating at atmospheric pressure in the range of about 180° to 300° C.

Other lesser preferred examples of diamines suitable for use herein include tetramethylene diamine, pentamethylene diamine, octamethylene diamine and decamethylene diamine. The amount of diamine needed to produce the high diamine containing polyamides of the present invention varies depending on the amount of amine desired and the molecule weight of the resulting polymer and can be easily determined by one skilled in the art. For example, about 0.25 mol percent of hexamethylene diamine is required to produce a polyepsiloncaprolactam of about 21,000 number average molecular weight having about 80 equivalents/10$^6$ gm amine end groups and about 17 equivalents/10$^6$ acid end groups. Generally the amount of amine end groups required in the polyamide, in order to give the improvement of the present invention, is at least 1.5 times the amount of acid end groups, preferably at least 2 times, more preferably at least 3 times, and most preferably at least 4 times.

It is preferred that the polyamide used herein have a maximum amount of amine functionality. The maximum amount of amine functionality is dependent on the number average molecular weight of the polyamide and can be easily calculated by use of the following formula:

$$R = \frac{\frac{10^6}{m} + \sqrt{\frac{10^{12}}{m^2} - 450}}{\frac{10^6}{m} - \sqrt{\frac{10^{12}}{m^2} - 450}}$$

where R is the maximum practical ratio of amine to acid functionality and m is the number average molecular weight. For example, for a polyepsiloncaprolactam having a number average molecular weight of 40,000, the maximum ratio of amine to acid functionality in the polyamide would be about 3.2 to 1 and for a number average molecular weight of 17,000 the maximum ratio of amine to acid would be about 29 to 1.

A preferred polyamide is polyepsiloncaprolactam containing 60 to 97 mol percent of its end groups as amine end groups.

The homopolymer useful in the present invention is of the type disclosed in U.S. Pat. No. 4,138,709 hereby incorporated by reference. The homopolymer is formed from a monomer having the formula:

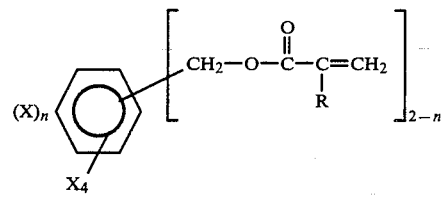

wherein n=0 or 1, X is bromine or chlorine and R is hydrogen or methyl. Preferably, n is equal to 1 and x is bromine. More preferably R is equal to H. The most preferred homopolymer is made from the monomer having the formula:

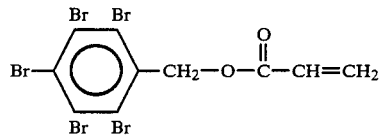

The homopolymer has a molecular weight between $1 \times 10^3$ and $10 \times 10^6$, and preferably from $5 \times 10^3$ to $5 \times 10^6$. The molecular weight values are determined as disclosed in U.S. Pat. No. 4,128,709. It is indicated that the molecular weight values given are those determined in accordance with a technique of Gel Permeation Chromotography and Solution Viscosity as published in B. Vollmert, "Goundriss der mackromoleku laren Chemie".

The composition of the present invention contains from 5 to 20 and preferably from 8 to 16 weight percent of the homopolymer, which is preferably pentabromobenzyl polyacrylate. The composition contains correspondingly 80 to 95 and preferably 84 to 92 weight percent of a polyamide which is preferably polyepsiloncaprolactam.

In the preferred composition of the present invention, there is from 0 to 10, preferably 1 to 10 and more preferably 2 to 6 weight percent of antimony oxide in place of a corresponding amount of polyamide.

The composition of the present invention can contain conventional additives such as stabilizers and inhibitors of oxidative, thermal and ultraviolet light degradation; lubricants and mold release agents, colorants, including dyes and pigments; fibrous and particulate fillers and reinforcements; nucleating agents; plasticizers; and impact modifiers; etc. Typical additives are disclosed in U.S. Pat. No. 4,174,358, hereby incorporated by reference.

The composition of the present invention can include polyamide impact modifiers known in the art. Included in those are ionic copolymers as disclosed in U.S. Pat. Nos. 3,264,272; 3,845,163; and 4,174,358 hereby incorporated by reference. Other useful impact modifiers include those disclosed in U.S. Pat. Nos. 3,472,916; 4,160,790; 4,335,223, and 4,404,325 hereby incorporated by reference. These patents disclose various combinations of copolymers of alpha olefins with esters or acids with the optional addition of other ingredients such as metal oxides. There is preferably from 1 to 40 and more preferably from 2 to 15 weight percent of the impact modifier based on the weight of the polyamide.

A preferred impact modifier is a combination of an ester copolymer and a copolymer of ethylene and an alpha, beta-ethylenically unsaturated carboxylic acid where there are from 0 to 100 percent of the carboxyl groups neutralized with metal ions as disclosed in U.S. Pat. Nos. 4,160,790 and 4,335,223. Other known impact modifiers useful in polyamides can be used, including but not limited to elastomeric impact modifiers such as EPDM elastomers.

Any suitable fillers can be used as are known in the art. The fillers may optionally be treated with various coupling agents or adhesion promotors as are known to those skilled in the art. Such fillers may be selected from a wide variety of minerals, metals, metal oxides, siliceous materials, metal salts and the like.

U.S. Pat. No. Re. 28,646, reissued Dec. 9, 1975, hereby incorporated by reference, discloses a list of fillers suitable for use in the composition of the present invention. Example of useful fillers include alumina, aluminum hydrates, felspar, asbestos, talc, calcium carbonates, clay, carbon black, quartz, novaculite and other forms of silica, kaolinite, garnet, mica, saponite, bentonite, calcium oxide, calcium hydroxide, metal silicates including calcium metasilicate, aluminum silicate, calcium magnesium silicates and an acicular aluminum silicate. Included in the fillers useful in the present invention are various forms of glass filler including microspheres short glass fibers and long glass fibers. A preferred filler is short glass fibers. There can be from 1 to 100 weight percent and preferably from 10 to 50 weight percent filler. Preferably, there is from 10 to 50 weight percent of short glass fibers as a filler when a filler is used.

The compositions of the present invention can be made on conventional mixing equipment. The various components can optionally first be physically blended and then combined on conventional melt blending equipment. Typical equipment includes Banbury internal mixers, mill mixing, extruders, or the like. Alternately, the blends may be made by solution blending or by dry mixing together of a component followed by melt fabrication of the dry mixture by extrusion or injection molding. In the case of injection molding of dry mixtures, screw preplasticization or other methods of giving good mixing should be employed. Preferably, the polyamide composition is melt blended in an extruder.

In an embodiment of the present invention the flame retardant homopolymer and optionally other ingredients including antimony oxide can first be made into a preblend or masterbatch. Such a masterbatch can be made on equipment including a Farrel continuous mixer or alternately on the type of mixing and melt blending equipment discussed above.

The present invention includes a composition suitable for use as a masterbatch. The composition comprises from 1 to 90 weight percent and preferably from 50 to 90 weight percent of a homopolymer of the monomer having the formula:

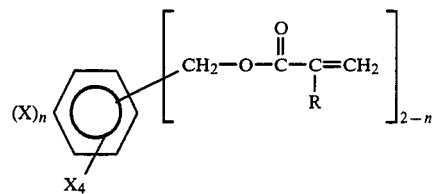

wherein $n=0$ or 1, X is bromine or chlorine and R is hydrogen or methyl. Preferably n is equal to 1, X is bromine and R is hydrogen. The homopolymer preferably has a molecular weight in the range of $1 \times 10^6$ and $10 \times 10^6$ and more preferably $5 \times 10^3$ to $5 \times 10^6$ as measured by gel permeation chromotography in tetrahydrofuran.

The masterbatch composition of the present invention can be combined with the polyamide and optionally the additional materials noted above to form the composition of the present invention.

Several examples are set forth below to illustrate the nature of the invention and the manner of carrying it out. However, the invention should not be considered as being limited to the details thereof. All percents are by weight unless otherwise indicated.

Flammability testing was conducted according to Underwriter's Laboratory Test Procedure UL-94 (incorporated by reference). According to this procedure a ¾ inch methane flame is applied for 10 seconds to the bottom of a vertical bar made of the sample which is 5 inches long, ½ inch wide and 1/32 inches thick. There is a dry absorbent surgical cotton cloth 12 inches below the bottom of the bar. If the sample completely burns it is given a rating of N.R.—no rating. If the sample self-extinguishes the flame is applied again for 10 seconds. This procedure is repeated for five bars of each sample. A sample is rated V-0 if: none of the five bars turns for more than 10 seconds after application of the flame; there cannot be a total flaming for greater than 50 seconds; and none of the samples melt resulting in a drip which ignites the cotton. A sample is rated V-1 if: none of the bars burn for greater than 30 seconds; total flaming of the five samples does not exceed 250 seconds; and the cotton is not ignited. A sample is rated V-2 if: the sample burns within the time limits of a V-0 rated sample but the cotton ignites from molten drops of the sample.

Drop weight impact was conducted according to ASTM Procedure D-2444 modified to use a base having a 4 inch outside diameter and a 3 inch inside diameter and a dart having a one inch tip diameter. The test discs were 4 inches in diameter and ⅛ inches thick. Tensile and elongation tests were conducted according to ASTM Procedure No. D-638 with a Type 2 specimen. Notched Izod impact resistance testing was conducted according to ASTM Test Procedure D-256.

The polyamide used was polyepsiloncaprolactam (NT) having a formic acid viscosity of 55. The chain ends of the polyepsiloncaprolactam were more than 80% terminated with hexamethylene diamine.

The antimony oxide ($Sb_2O_3$) used in the following examples was Fire Shield TM antimony oxide produced by PPG Industries, the antimony oxide used was H Grade having an average particle size of 1.0 to 1.8 μm. This material is described in PPG Industries bulletin Antimony Oxide, Bulletin No. A1339-800, hereby incorporated by reference.

The flame retardant used was pentabromobenzyl polyacrylate (PBBPA). The material used was a white powder, 90% of which was between 70 and 200 μm. The bromine content was 70 to 71%. The melting range was 205° to 215° C. and the density was approximately 2.05 grams per cubic centimeter. The PBBPA used was obtained from Bromine Compounds Limited of Beer Sheva Israel.

EXAMPLES 1-4

The compositions in the following Examples and Comparatives were generally prepared by first dry blending the materials of each compositions. Each dry blended composition was fed into the hopper of a 2½ inch single screw extruder, having a 40/1, L/D ratio and manufactured by the Egan Corporation. The average extruder temperature was about 490° F. and the extrudate was pelletized. Test samples were injection molded on a Battenfeld injection molding machine having a 75 ton clamp at about 500° F.

The compositions in the following Examples and Comparatives also contained copper chloride ($CuCl_2$); potassium iodide (KI); potassium bromide (KBr); zinc stearate (ZnSt); and sodium stearate (NaSt). Comparative Examples were made using polyepsiloncaprolactam (NU) having a formic acid viscosity of 70. The polyepsiloncaprolactam in the Comparative Examples had an equal number of chain ends terminated with amine groups and carboxylic acid groups.

The compositions imparts by weight, tensile at yield (psi), tensile at break (psi), elongation, drop weight impact values (ft-lbs) and UL-94 results for the Examples 1-4 and Comparatives 1-4 are summarized in Table I below:

by the DuPont Company as Surlyn ® 1801 (S1801) and described as having a melt index of 1.0 decigram per minute (ASTM D 1238); 10 parts of PBBPA; 43.6 parts of octabromodiphenyl oxide (OBDPO); and 13.4 parts of antimony oxide ($Sb_2O_3$). The masterbatch was prepared in an LNP Columbo Co. of Torino, Italy, Model No. RC-2, 2-inch corotating twin screw extruder at 250° C.

The masterbatch was extruder melt blended with polyepsiloncaprolactam (NT) of the same type used in Examples 1-4 in 2½ inch diameter, 24 L/D NRM single screw extruder. The conditions were Zone 1—500° F.; Zone 2—475° F.; Zone 3—460° F.; Zone 4—440° F.; Flange 440+ F.; and die 440° F. The extruder was run at 88 rpm. The composition contained 55 parts by weight of polyepsiloncaprolactam and 45 parts by weight of the masterbatch. The final compositions and results of the UL-94 flammability testing are summarized in Table 2.

COMPARATIVE 5

A masterbatch was prepared in the same manner as in Example 5 having in parts by weight 6.25 parts EEA; 43.75 parts S1801; 40 parts OBDPO; and 10 parts $Sb_2O_3$. This masterbatch was extruder melt blended with 67 parts by weight of the polyepsiloncaprolactam (NT) of Examples 1-5 in the same manner as Example 5. The final composition and the results of the UL-94 flammability testing is summarized in TABLE 2.

TABLE 2

| Components | Ex. 5 | Comp. 5 |
|---|---|---|
| NT | 55 | 67.0 |
| PBBPA | 4.5 | — |
| OBDPO | 19.6 | 13.2 |
| EEA | 1.91 | 2.06 |
| S1801 | 12.9 | 14.4 |
| $Sb_2O_3$ | 6.0 | 3.3 |
| UL-94 | V-0 | V-2 |

TABLE I

| Component | Ex. 1 | Comp. 1 | Ex. 2 | Comp. 2 | Ex. 3 | Comp. 3 | Ex. 4 | Comp. 4 |
|---|---|---|---|---|---|---|---|---|
| NT | 81.45 | — | 81.45 | — | 82.05 | — | 82.05 | — |
| NU | — | 81.45 | — | 81.45 | — | 82.05 | — | 82.05 |
| PBBPA | 14.0 | 14.0 | 14.0 | 14.0 | 14.0 | 14.0 | 14.0 | 14.0 |
| $Sb_2O_3$ | 3.5 | 3.5 | 3.5 | 3.5 | 3.5 | 3.5 | 3.5 | 3.5 |
| $CuCl_2$ | 0.05 | 0.05 | 0.05 | 0.05 | 0.05 | 0.05 | 0.05 | 0.05 |
| KI | — | — | 0.25 | 0.25 | — | — | 0.25 | 0.25 |
| KBr | 0.25 | 0.25 | — | — | 0.25 | 0.25 | — | — |
| ZnSt | 0.75 | 0.75 | 0.75 | 0.75 | .15 | .15 | .15 | .15 |
| Yield Tensile (psi) | 12,200 | 12,800 | 12,100 | 12,800 | 12,300 | 12,900 | 12,100 | 12,700 |
| Break Tensile (psi) | 7,900 | 7,200 | 8,200 | 7,700 | 8,300 | 8,400 | 8,200 | 8,700 |
| Elong (%) | 55 | 18 | 58 | 35 | 57 | 37 | 42 | 33 |
| Drop Wt (ft-lbs) | 19 | 22 | 19 | 26 | 15 | 15 | 21 | 32 |
| UL-94 | V-0 | V-0 | V-0 | V-2 | V-0 | V-2 | V-0 | V-2 |

During the UL-94 flammability testing Comparatives 1-4 were observed to freely drip while the Example 1-4 compositions had little or no dripping. Comparative 1 dripped freely while Example 1 had little or no dripping. The drips from Comparative 1 and Example 1 did not cause ignition of the cotton. The drips from Comparatives 2-4 caused the cotton to ignite. There was no ignition from drips, if any, from Examples 2-4.

EXAMPLE 5

A masterbatch composition was prepared containing in parts by weight: 4.25 parts ethylene ethyl acrylate (EEA) manufactured by Union Carbide as Bakelite Flexible Ethylene Copolymer DPD 6169 and having a melt index of 6 grams/10 minutes and an ethyl acrylate content of 18 weight percent; 28.6 parts of zinc neutralized copolymer of ethylene and methacrylic acid sold During the UL-94 flammability testing the composition of Example 5 did not drip while that of Comparative 5 dripped and ignited the cotton.

While exemplary embodiments of the invention have been described, the true scope of the invention is to be determined from the following claims:

What is claimed is:

1. A composition comprising: from 5 to 20 weight percent of a homopolymer of a monomer having the formula

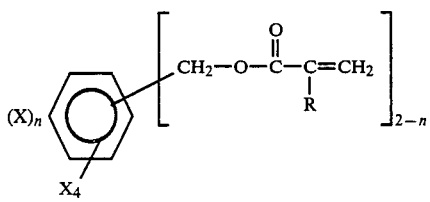

wherein n=0 or 1, X is bromine or chlorine and R is hydrogen or methyl, said polymer having a molecular weight between $1 \times 10^3$ and $10 \times 10^6$, said molecular weight determined by gel permeation chromotography in tetrahydrofuran;
  from 80 to 95 weight percent of a polyamide having an excess of polymer chains terminated with amine end groups; and
  from 0 to 10 weight percent of antimony oxide in place of a corresponding amount of polyamide.

2. The composition as recited in claim 1 wherein n=1 and X is bromine.

3. The composition as recited in claim 2 wherein the molecular weight is between $5 \times 10^3$ to $5 \times 10^6$.

4. The composition as recited in claim 2 wherein R is H.

5. The composition as recited in claim 4 wherein there is from 8 to 16 weight percent of the homopolymer of a monomer having the formula

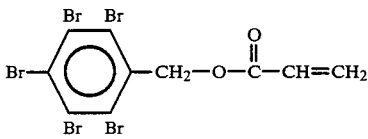

6. The composition as recited in claim 5 further comprising from 1 to 10 weight percent of antimony oxide in place of a corresponding amount of polyamide.

7. The composition as recited in claim 1 wherein the polyamide contains at least 1.5 times as many amine end groups than acids groups.

8. The composition as recited in claim 1 further comprising from 1 to 40 percent based on the weight of the polyamide of an impact modifier.

9. The composition as recited in claim 1 further comprising a filler.

10. The composition as recited in claim 1 wherein the filler is short glass fibers.

11. The composition as recited in claim 1 wherein the polyamide is polyepsiloncaprolactam.

12. A composition comprising:
  from 5 to 20 weight percent of a homopolymer of a monomer having the formula

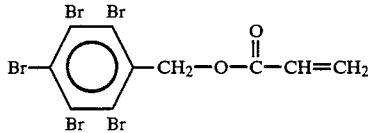

said homopolymer having a molecular weight between $1 \times 10^3$ and $10 \times 10^6$, said molecular weight determined by gel permeation chromotography in tetrahydrofuran; and
  from 80 to 95 weight percent of polyepsiloncaprolactam having an excess of polymer chain ends terminated with amine end groups.

13. The composition as recited in claim 12 further comprising from 1 to 10 weight percent of antimony oxide in place of a corresponding amount of antimony oxide.

14. The composition as recited in claim 12 further comprising from 1 to 50 weight percent of a filler in place of a corresponding amount of polyepsiloncaprolactam.

15. The composition as recited in claim 14 wherein the filler is short glass fibers.

16. The composition as recited in claim 14 further comprising from 1 to 40 percent based on the weight of the polyepsiloncaprolactam.

17. A composition comprising from 1 to 90 weight percent of homopolymer of a monomer having the formula

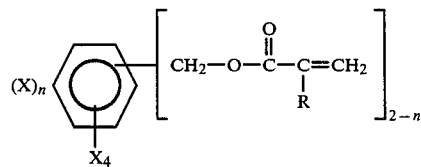

wherein n=0 or 1, X is bromine or chlorine, R is hydrogen or methyl, said polymer having a molecular weight between $1 \times 10^3$ and $10 \times 10^6$, said molecular weight determined by gel permeation chromotography in tetrahydrofuran;
  from 10 to 99 weight percent of a polyamide having an excess of polymer chains terminated with amine end groups; and
  from 0 to 30 weight percent of antimony oxide in place of a corresponding amount of the homopolymer.

18. An unfilled flame retardant polyamide composition comprising:
  from 5 to 20 weight percent of a homopolymer of a monomer having the formula

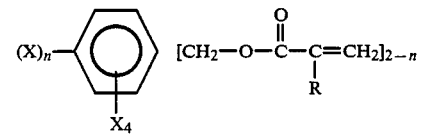

wherein n=0 or 1, X is bromine or chlorine, R is hydrogen or methyl, said polymer having a molecular weight between $1 \times 10^3$ and $10 \times 10^6$, said molecular weight determined by gel permeation chromotography in tetrahydrofuran; from 80 to 95 weight percent of a polyamide; and from 0 to 10 weight percent of antimony oxide in place of a corresponding amount of the polyamide having an excess of polymer chain ends terminated with amine end groups.

19. The composition as recited in claim 18 wherein n=1, X is bromine and R is H.

* * * * *